Nov. 25, 1952     L. MULLNER     2,619,294
EARTH PULVERIZER WITH ROCK SEPARATING MEANS
Filed Aug. 13, 1949     2 SHEETS—SHEET 1

Inventor
Louis Mullner
By Robert M. Dunning
Attorney

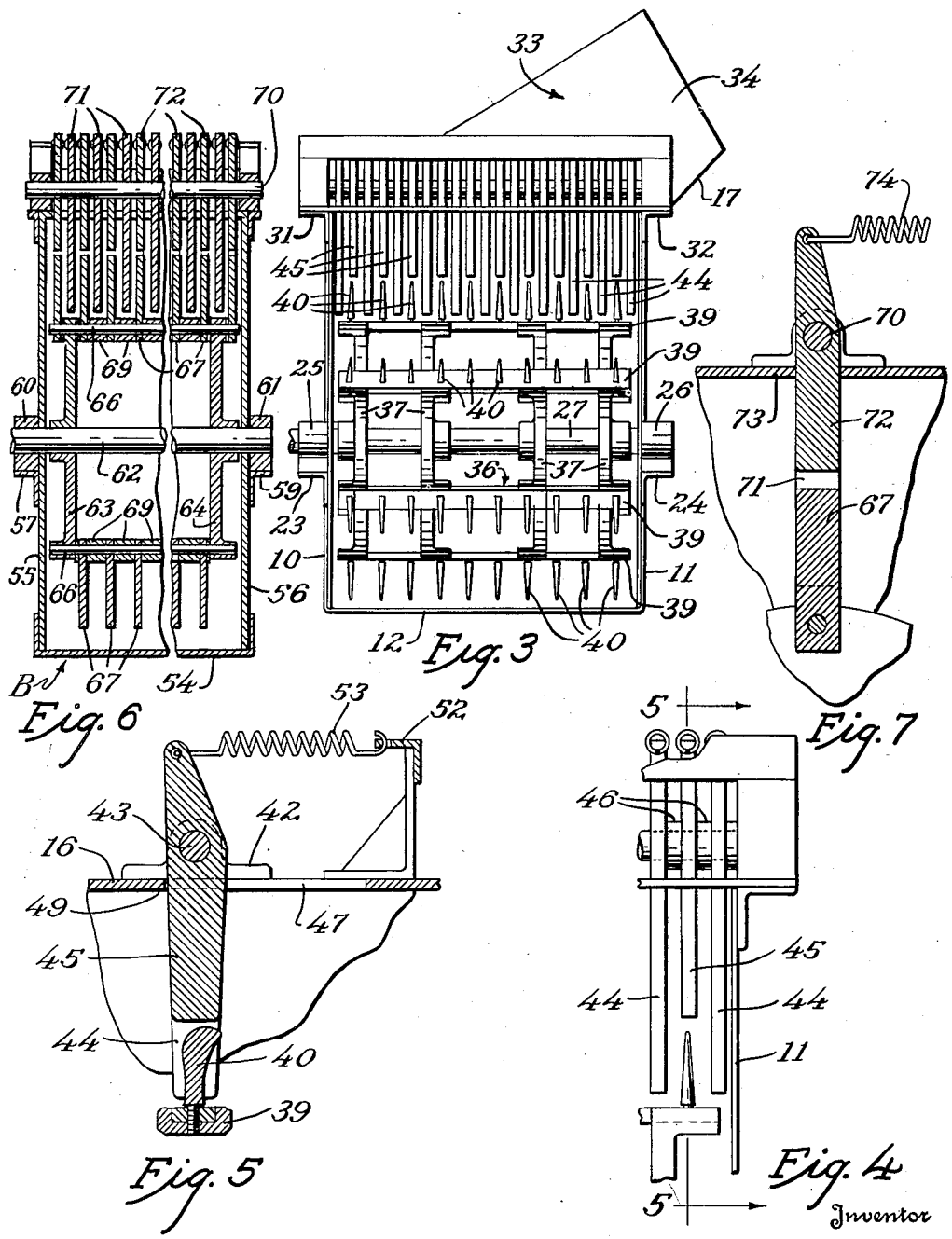

Patented Nov. 25, 1952

2,619,294

UNITED STATES PATENT OFFICE 2,619,294

EARTH PULVERIZER WITH ROCK SEPARATING MEANS

Louis Mullner, St. Paul, Minn.

Application August 13, 1949, Serial No. 110,067

10 Claims. (Cl. 241—186)

My invention relates to an improvement in pulverizing machine and deals particularly with a device designed to break up earth into small particles.

In the sale of black dirt, peat, peat moss, and the like, it is often desirable to pulverize the earth before delivering the same. When the dirt is dug from the ground, it is usually removed in large lumps or cakes which are unsuitable to be spread upon the ground or used in landscaping or the like. Pulverizers of various types have been made for this purpose. However, most such pulverizers are easily broken and are often in need of repair due to the presence of stones and other foreign materials in the dirt.

An object of the present invention lies in the provision of a pulverizing apparatus which acts to break up lumps of dirt and similar materials into small particles and which at the same time will not be injured by the presence of rocks and other hard objects. My device is so arranged that if such objects are placed in the pulverizer they will not break the teeth thereof and the arrangement is such that most of the stones and other foreign materials are eliminated from the dirt.

A feature of the present invention lies in the provision of a pulverizer having a rotatable element equipped with outwardly projecting teeth and a series of pivotally supported teeth past which the rotatable teeth may rotate. The pivotally supported teeth are resiliently supported so as to pivot in a manner to permit a large object to pass through the series of pivotally supported teeth if sufficient force is exerted against the same. The pivotally supported teeth have a tendency to urge rocks and other such objects rearwardly until they are thrown from the casing through a suitable outlet.

A feature of the present invention lies in the individual supporting of the pivotally supported teeth so that one or more teeth may pivot to permit the passage of an object without pivoting all of the teeth. In the past it has been attempted to pivotally support a series of teeth cooperable with the rotatable teeth. However, in the past the teeth were connected together so that all of the teeth pivot in unison. As a result if a stone should cause the pivotally supported teeth to pivot so that a rock or other object may pass by, all of the cooperable teeth are moved out of operating position temporarily so as to cause intermittent operation of the pulverizing means.

A further feature of the present invention resides in the specific arrangement of the pivotally supported teeth. The teeth on the rotatable member are arranged in spaced relation and a pivotally supported tooth is arranged to extend between the spaced teeth so as to extend in overlapping relation therewith. A second series of shorter pivotally supported teeth are mounted between the first mentioned pivotally supported teeth and extend in substantial alignment with the rotatable teeth, but outwardly therefrom. This specific tooth arrangement has been found of particular advantage in the construction.

An added feature of the present invention lies in the fact that the apparatus operates to eliminate most of the rocks or similar foreign objects from the dirt during the operation of the apparatus. The rotatable series of teeth rotates at a relatively high speed and tends to carry the dirt and other material toward the outlet of the machine. The heavier objects such as rocks and the like are thrown upwardly by centrifugal force and a suitable outlet is provided through which the rocks may be deflected in order to eliminate them from the material being pulverized.

These and other objects and novel features of my invention will be more clearly and fully set forth in the following specification and claims.

In the drawings forming a part of my specification:

Figure 3 is an end elevation view of the outlet end of the apparatus.

Figure 4 is an enlarged view showing a part of the construction illustrated in Figure 3.

Figure 5 is a sectional view through a detailed portion of the apparatus, the position of the section being indicated by the line 5—5 of Figure 4.

Figure 6 is a view similar to Figure 3 showing a modified form of construction.

Figure 7 is a sectional view similar to Figure 5 showing the form of construction illustrated in Figure 6.

Figure 1:
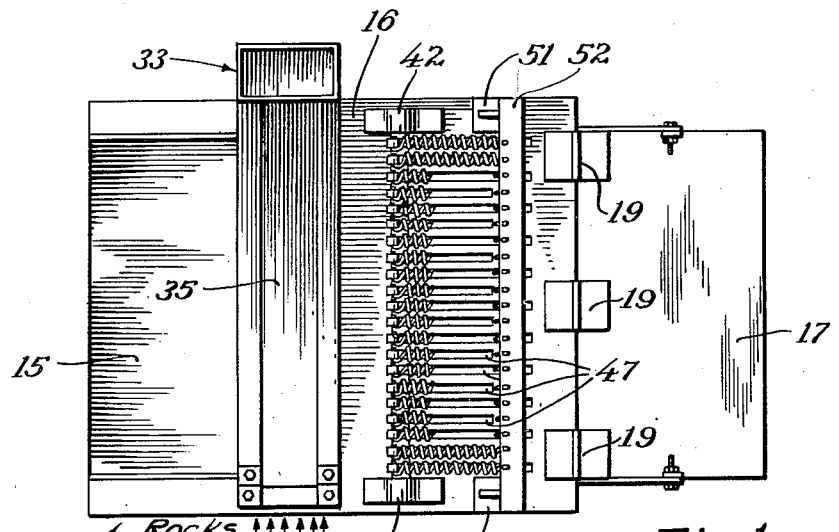
Figure 1 is a top plan view of my pulverizing apparatus showing the construction thereof.

The pulverizer A includes a casing or housing into which the material to be pulverized is inserted. This casing includes a pair of spaced side wall panels 10 and 11 which are supported in spaced parallel relationship. The side panels 10 and 11 are connected by a bottom panel 12, an inclined wall panel 13, a vertical wall panel 14, and an inclined hopper panel 15. The side panels 10 and 11 are also connected by a top panel 16 which extends over a portion of the top of the casing leaving the space above the inclined hopper panel 15 open so that the material to be pulverized may be inserted at this point.

A deflection panel 17 is hingedly connected at 19 to the top panel 16. The deflection panel 17 is supported in proper angular relation to the top panel 16 by braces 20 which are pivotally bolted at 21 to the side panels 10 and 11 and pivoted to the deflection panel 16 at 22. The panel 17 may be inclined downwardly at an angle if desired to prevent the pulverized material from being ejected from the apparatus at as high an elevation as would otherwise be possible.

An angle frame member 23 is secured on a horizontal plane along the side panel 10 and a similar angle member 24 is welded or otherwise secured to the opposite wall panel 11. These angle members 23 and 24 are provided with horizontal flanges which support a pair of axially aligned bearings 25 and 26 respectively. The bearings 25 and 26 support a shaft 27 which extends through the casing. The shaft 27 extends through the panels 10 and 11 and is supported near each end by the bearings 25 and 26. One end of the shaft may extend beyond its bearing to accommodate a suitable pulley for attachment with a source of power supply.

In preferred form the panels 10 and 11 are provided with a transverse slot 29 through which the shaft 27 may be inserted, the slots 29 permitting the shaft with its assembled pulverizing rotor to be inserted into the apparatus. Reinforcing strips 30 are removably attached to the panels 10 and 11 to bridge the slots 29 and to prevent collapse of the side panels.

A pair of angle members 31 and 32 extend along the upper edge of the side panels 10 and 11 respectively with the horizontal flange of the angles flush with the upper edges of the side panels. The top panel 16 is of sufficient width to overlie these angles 31 and 32 and to be attached thereto. A discharge spout 33 is supported by the angles 31 and 32 to extend over the portion of the casing above and inwardly of the vertical wall panel 14. The discharge chute 33 includes side panels such as 34 and an inclined top panel 35 which may be arranged at any desired angle to the horizontal. It is desirable that the top panel 35 incline upwardly at an angle of approximately forty-five degrees with the horizontal, but such a steep angle is not entirely essential. The spout 34 is provided with an open end through which rocks and other foreign material may be ejected.

The rotor used for breaking up the material to be pulverized is indicated in general by the numeral 36. This rotor includes a pair of axially spaced spiders 37 mounted upon the shaft 27 for rotation in unison therewith. A series of angularly spaced tooth bars 39 connect the various spiders 37. The tooth bars 39 support a series of equally spaced teeth 40. The teeth 40 are preferably removably connected to the bars 39 as best illustrated in Figure 5 of the drawings. The teeth 40 of all of the bearings 37 are aligned so as to follow in similar rotative paths. It is essential that the teeth 40 follow in approximately the same path so as to properly cooperate with the relatively fixed teeth mounted in the casing.

Figure 2:
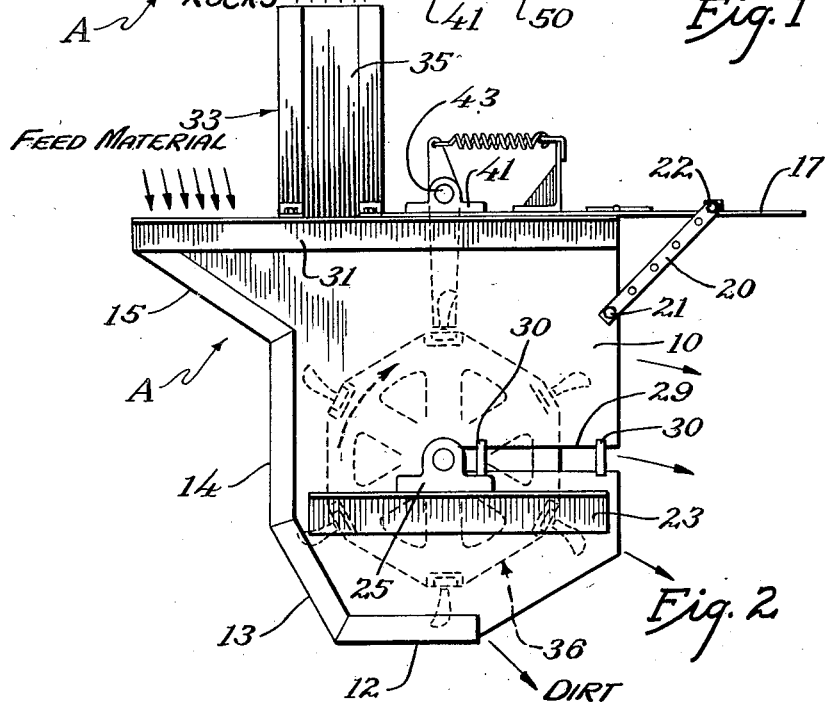
Figure 2 is a side elevational view of the same.

A pair of spaced bearings 41 and 42 are mounted on the opposite sides of the top panel 16 and are bolted through other angle members 31 and 32. These bearings 41 and 42 support a transversely extending shaft 43 which is substantially parallel to the shaft 27. A series of downwardly extending teeth 44 and 45 are pivotally supported upon the shaft 43 and are held in properly spaced relation by spacers 46. The teeth 44 and 45 pivot freely with respect to the shaft 43 and any of the teeth may pivot individually. The top panel 16 is slotted as indicated at 47 to accommodate the various teeth. The teeth are held from rotation in one direction by engagement with the shoulders 49 at the ends of the slot 47 in the panel 16. A pair of brackets 50 and 51 are mounted upon opposite sides of the panel 16 above the angle members 31 and 32. These brackets 51 support a transversely extending angle member 52 extending transversely of the casing. Springs 53 connect each of the teeth 44 and 45 with the angle member 52 to resist rotation of the teeth in a counterclockwise direction as viewed in Figures 2 and 5.

It will be noted that teeth 45 are relatively short while the teeth 44 are substantially longer. The teeth 45 are mounted in alignment with the teeth 40 of the rotor unit 36. The teeth 45 terminate in radially spaced relation to the inner ends of the teeth 40 and provide clearance through which pulverized material may pass. The spacing however, is insufficient to permit the passage of any large object between the teeth 40 and the teeth 45.

The longer teeth 44 are alternately arranged with the teeth 45 and are shaped to extend into close proximity with the tooth bars 39 of the rotor unit 36. Thus the teeth 44 are in overlapping relation with the teeth 40 and normally the teeth 40 pass between the lower ends of the teeth 44. The spacing between the teeth 40 and 44 is sufficient to permit pulverized material to pass, but to resist the passage of larger objects.

In operation a suitable source of power is applied to the shaft 27 to rotate this shaft at a relatively high rate of speed. Dirt is inserted into the inlet end of the machine sliding down the inclined panel 15 and dropping downwardly into the housing. The rotation of the rotor causes the material to be finely broken up and gradually impelled toward the opposite side of the casing which is open and through which the pulverized dirt may be ejected. The deflector panel 17 may be adjusted to direct the pulverized material in the proper direction.

If a rock or other such object is dropped into the casing it is picked up by the spaced teeth and thrown upwardly in the casing. If the rock engages against the rotating teeth it is carried against the pivoted teeth 44 and 45. These teeth resist passage of the rock and tend to disengage it from the rotating teeth 40. If the teeth 40 engage the rock squarely the teeth 45 and 44 near the tooth 40 are pivoted about their axes 43, elongating the respective springs 53. If the rock does not extend beyond the periphery of the teeth 40 only the teeth 44 are pivoted, not permitting the rock to pass. If the rock is not squarely engaged by the teeth 40 the teeth 44 and 45 tend to disengage the rock from the teeth 40 and tends to return the rock into the inlet end of the apparatus. The rocks thrown upwardly by the teeth 40 and by the spring action of the teeth 44 and 45 are deflected by the inclined spout panel 35 and are ejected through the chute 33.

In actual practice I have found that very few of the rocks are engaged with the teeth 40 squarely enough to be carried past the teeth 44 and 45. Most of the rocks are thrown upwardly by action of the rotor and are deflected by the spout panel 35 out through the open end of the spout. Thus my device tends to eliminate a large percentage of the rocks and other foreign objects from the dirt being pulverized.

In Figures 6 and 7 of the drawings I disclose a device which is in general similar to the construction previously described. The casing 54 of the pulverizer B is virtually identical with the casing of the pulverizer A and thus will not be described in detail. The side panels 55 and 56 of the pulverizer B support horizontal angle irons 57 and 59, which in turn support opposed bearings 60 and 61 similar to the bearings 25 and 26. The bearings 60 and 61 support the rotor shaft 62. The rotor shaft 62 supports spaced spiders 63 and 64. These spiders 63 and 64 are secured to the shaft 62 to rotate in unison therewith and are connected by a series of shafts 66 arranged in angularly spaced relationship.

The shafts 66 support a series of teeth 67 in spaced relationship. The teeth 67 are held in proper spaced relationship by spaced sleeves 69. The teeth 67 are free to rotate about the shafts 66 and are held in normally radial position during rotation of the rotor but act by centrifugal force.

The teeth 67 are equally spaced and arranged to follow the same rotative path during rotation of the rotor. The casing supports a transverse shaft 70 which supports a series of teeth 71 and an alternate series of teeth 72. The teeth 71 extend downwardly into close proximity with the rotor and straddle the teeth 67 of the rotor. The alternate teeth 72 extend in alignment with the rotor teeth 67 and are sufficiently short to terminate in radially spaced relation to the ends of the rotor teeth 67.

As best shown in Figure 7 of the drawings the teeth 71 and 72 are held from rotation in one direction by engagement with the top panel 73 of the housing. Springs 74 are provided for resisting rotation of these pivoted teeth in the opposite direction. The springs 74 are mounted similarly to the springs 53 previously described.

The operation of the pulverizer B is believed clearly understandable from the foregoing description. The rotor of the apparatus is connected to a suitable source of power which rotates the shaft 62 at a relatively high rate of speed. As speed increases the pivotally supported teeth 67 tend to extend radially from the rotor due to the action of centrifugal force. However, these teeth are free to pivot rearwardly upon engagement with a heavy object such as a rock or the like. The teeth 67 in their rotation tend to pass through the material to be pulverized and divide the material into small particles. The teeth 67 engages against foreign objects such as rocks and tend to throw the rocks upwardly in the manner previously described. The casing is provided with an outlet similar to the outlet 33 previously described which permits the ejection of rocks from the inlet end of the apparatus. However, the rocks may pass through the apparatus to the outlet end thereof, the teeth 67, 71 and 72 all being pivotally supported so that such objects may pass through the apparatus if necessary without injury to the device.

The arrangement of teeth is such as to finely divide the material and yet to permit the passage of large objects without breaking the teeth. Most of the rocks and other foreign materials are ejected through the outlet spout such as 33, while a small percentage of such objects pass through the teeth and out through the outlet end of the machine. The teeth may individually pivot so that only the teeth engaged by the foreign object are pivoted and the extent to which they are pivoted depends upon the size and shape of the object.

In accordance with the patent statutes, I have described the principles of construction and operation of my pulverizing machine, and while I have endeavored to set forth the best embodiment thereof, I desire to have it understood that this is only illustrative thereof, and that obvious changes may be made within the scope of the following claims without departing from the spirit of my invention.

I claim:

1. A pulverizing apparatus including a rotor, a rotor support, a series of tines on said rotor in axially spaced relation, a series of cooperable tines between which said first mentioned tines may pass, a series of tines in radially spaced relation to the rotatably supported tines, the tines between which the rotative tines pass being alternately arranged with the radially spaced teeth, and means pivotally supporting both of the last two named series of teeth.

2. The construction described in claim 1 in which the tines between which the rotative teeth pass and the radially spaced tines are resiliently held in position.

3. A pulverizing apparatus including a rotor, a rotor support, a series of axially spaced tines on said rotor, relatively fixed tines cooperable with the rotatable tines, the fixed tines comprising alternate long and short tines, the long tines extending between said rotative tines during the rotation thereof and the remaining tines extending in radially spaced relation to the ends of the rotative tines during rotation thereof, and means pivotally supporting said relatively fixed tines.

4. The construction described in claim 3 in which the fixed tines are pivoted on a single axis.

5. The construction described in claim 3 and including means for resiliently holding said relatively fixed tines in fixed position.

6. A pulverizer including a casing, a rotor rotatably supported within said casing, a series of radially extending teeth supported by said rotor for rotation therewith, a series of relatively fixed teeth supported within said casing and cooperable with the rotatable teeth to pulverize material passing therebetween, an inclined inlet above the level of said rotor and to one side thereof, an auxiliary discharge spout on the top of the casing and above the upturning portion of the rotor, said discharge spout having an inclined deflecting panel for deflecting material thrown upwardup against said panel through the end of said spout, and a main discharge outlet on the other side of said rotor.

7. The construction described in claim 6 in which the relatively fixed teeth are supported substantially above the axis of the rotor to extend toward the rotor axis.

8. The construction described in claim 6 in which the fixed teeth are pivotally supported and resiliently urged into position substantially radially of said rotor.

9. A pulverizing apparatus including a rotor, a rotor support, a series of axially spaced tines on said rotor, individually pivotally mounted tines cooperable with the rotatable tines, the pivotally mounted tines comprising alternate long and short tines having a fixed pivotal axis, the long tines extending between said rotative tines during the rotation thereof and the short tines extending in radially spaced relation to the ends of the rotative tines during rotation thereof.

10. The construction described in claim 9 in which a spring is connected to each pivotally mounted tine for yieldingly urging its tine into a normal aligned relation with the other pivotal tines.

LOUIS MULLNER.

REFERENCES CITED

The following references are of record in the file of this patent:

UNITED STATES PATENTS

| Number | Name | Date |
|---|---|---|
| 61,424 | Haven | Jan. 22, 1867 |
| 431,612 | McKillen | July 8, 1890 |
| 775,942 | Sitter | Nov. 29, 1904 |
| 889,555 | Stedman | June 2, 1908 |
| 973,761 | Cline | Oct. 25, 1910 |
| 1,200,384 | Marquette | Oct. 3, 1916 |
| 2,213,906 | Ebersol | Sept. 3, 1940 |
| 2,264,049 | Miller | Nov. 25, 1941 |
| 2,297,604 | Bateman | Sept. 29, 1942 |
| 2,353,836 | Lindig | July 18, 1944 |
| 2,484,228 | Isay | Oct. 11, 1949 |

FOREIGN PATENTS

| Number | Country | Date |
|---|---|---|
| 172,231 | Germany | June 20, 1906 |